United States Patent [19]
Lilja et al.

[11] Patent Number: 5,787,165
[45] Date of Patent: Jul. 28, 1998

[54] HANDSFREE RADIOTELEPHONE HAVING DYNAMIC PATH ATTENUATION CONTROL FOR ECHO SUPPRESSION

[75] Inventors: Patrik Lilja; Eric Anthony Thomas, both of Raleigh, N.C.

[73] Assignee: Ericsson Inc., RTP, N.C.

[21] Appl. No.: 768,079

[22] Filed: Dec. 13, 1996

[51] Int. Cl.⁶ .................................................. H04M 9/08
[52] U.S. Cl. ........................ 379/390; 379/388; 379/389; 379/420
[58] Field of Search ........................ 379/390, 388, 379/389, 391, 410, 411, 420, 402, 404; 381/104, 111

[56] References Cited

U.S. PATENT DOCUMENTS

| | | | |
|---|---|---|---|
| 4,490,582 | 12/1984 | Munson | 179/81 |
| 4,670,903 | 6/1987 | Araseki et al. | 379/411 |
| 4,947,454 | 8/1990 | Garner | 455/84 |
| 4,984,265 | 1/1991 | Connan et al. | 379/390 |
| 5,027,393 | 6/1991 | Yamamura et al. | 379/410 |
| 5,313,498 | 5/1994 | Sano | 375/103 |
| 5,323,458 | 6/1994 | Park et al. | 379/390 |
| 5,398,281 | 3/1995 | Kurokawa et al. | 379/390 |
| 5,414,767 | 5/1995 | Kerguiduff | 379/410 |
| 5,459,786 | 10/1995 | Tomiyori et al. | 379/390 |
| 5,471,528 | 11/1995 | Reesor | 379/390 |
| 5,559,880 | 9/1996 | Shiono | 379/390 |
| 5,592,547 | 1/1997 | Wu et al. | 379/390 |
| 5,604,799 | 2/1997 | Komoda et al. | 379/390 |
| 5,612,996 | 3/1997 | Li | 379/390 |

*Primary Examiner*—Ahmad F. Matar
*Assistant Examiner*—Jacques Saint-Surin
*Attorney, Agent, or Firm*—David C. Hall

[57] ABSTRACT

A speakerphone having echo suppression is provided. The speakerphone has an audio control system comprising a transmit path, a receive path, a pair of rectifiers for producing rectified signals indicative of the strength of the signals present on the receive path and the transmit path, respectively, and an analog-to-digital converter for generating digital samples of the rectified signals for further processing. The audio control system further includes a general use microprocessor. Samples of the rectified signals are taken periodically and processed to determine if the receive path or the transmit path should have control, or if the audio system should be in an idle state. If speech is detected on either channel, the samples are weighted depending on the current state of the audio system. The weighted samples are then analyzed to determine which path should have control.

48 Claims, 12 Drawing Sheets

HANDSFREE RADIOTELEPHONE HAVING DYNAMIC PATH ATTENUATION CONTROL FOR ECHO SUPPRESSION

BACKGROUND OF THE INVENTION

1. Field of Invention

The present invention relates to speakerphones and to handheld radiotelephones when used in a "handsfree" mode of operation. In particular, the present invention relates to a handsfree radiotelephone having dynamic path attenuation control in both the transmit path and the receive path for suppression of echoes in both the transmit loop and the receive loop without the need for expensive digital signal processing hardware. The present invention is particularly suited for use in an automobile handsfree speakerphone.

2. Description of Related Art

The problem of echo suppression or cancellation in speakerphones is well known. Because both the microphone and the loudspeaker of a speakerphone are exposed, acoustic coupling can occur wherein acoustic signals output by the loudspeaker can be received as speech over the microphone, creating an undesirable feedback loop. This problem is not present to the same degree when using a conventional single-user telephone handset, since such handsets are typically designed to reduce or eliminate acoustic coupling between the microphone and the loudspeaker. In particular, the loudspeaker of a conventional telephone handset is typically covered by the ear of the user during operation, which all but eliminates the problem of acoustic coupling.

With the aid of external attachments such as a handsfree kit, portable radiotelephones or cellular telephones may be operated in a handsfree mode. In this mode, the radiotelephone functions in a manner similar to a conventional speakerphone, viz., both the microphone and the speaker are exposed, permitting signals output by the loudspeaker to be received by the microphone.

Moreover, handsfree kits for cellular telephone are typically designed for use in, and are typically used in, automobiles. Since an automobile interior is a relatively confined space, signals output from the loudspeaker tend to echo or reverberate within the automobile's interior. Thus the problem of acoustic coupling is exacerbated in an automobile environment by the number and strength of the echoes.

The problem of acoustic coupling is further exacerbated in the automobile environment due to the presence of high levels of noise. In an automobile environment, noise is generated from several sources, each having different characteristics. A relatively constant background wind noise may be present. There may also be engine noise and noise from external sources, such as a car horn or a passing truck, which can change pitch and intensity quickly in time.

Noise may also be present on the receive channel depending on the condition of the radio channel being used and the amount of interference present. Thus, a speakerphone system for use in an automobile must be adept at dealing with high levels of noise on both the receive channel and the transmit channel.

There may also be an electrical network echo present in the receive loop, which is usually caused by a reflection from a 4-wire to 2-wire hybrid interface somewhere in the network. Such echoes can complicate the operation of a handsfree system by causing locally originated signals to be incorrectly interpreted as having originated from the remote end of the call.

Various techniques have been proposed and implemented in order to address the problem of echoes in a speakerphone. These techniques generally fall into categories: echo suppression and echo cancellation. Echo cancellation typically involves calculating an estimated echo signal from the loudspeaker output signal and subtracting the estimated echo signal from the microphone input signal, thus generating a corrected input signal. Echo suppression, on the other hand, typically involves operating the telephone in half-duplex mode wherein only one path (the receive path or the transmit path) is open at any one time. It is also known to operate the telephone in a quasi-half duplex mode in which neither path is fully closed off, but one path may be attenuated more than the other path at any given time.

Examples of echo cancellation arrangements are given in U.S. Pat. Nos. 5,027,393, 5,323,458, and 5,414,767. Such arrangements typically involve the use of additional microphones which may permit noise cancellation in addition to echo cancellation and may permit operation of the telephone in full duplex mode. A drawback of such systems is that they are typically complicated and expensive to implement, requiring the use of expensive digital signal processing hardware. Echo cancellation systems may therefore be undesirable for use in a cellular radiotelephone when cost considerations are important.

The use of multiple microphones for echo cancellation, such as disclosed for example in the '393 patent and the '458 patent, although perhaps useful in an office speakerphone system, is not advantageous in an automobile environment due to the difficulty and cost associated with positioning multiple microphones within an automobile.

As noted above, echo suppression techniques generally involve operating the telephone in half duplex or quasi-half duplex mode. In such a mode of operation, only one path is fully open at a given time. Which path is open depends on which path has "control" at any given moment. A voice switch or a pair of attenuators is used to open the path having control and close the other path. In prior art systems, a path typically gains control when the party at the transmit end of the path begins speaking, and does not relinquish control until that party stops speaking, regardless of whether the other party attempts to interrupt. Natural conversation is difficult when using such a system. Moreover, such a system may give control to a path when noise is detected at one end and interpreted as speech. If this happens, it may be difficult or impossible for a party to "break in" and gain control of the channel, even though the other party is not speaking.

An example of an echo suppression system is disclosed in U.S. Pat. No. 4,670,903 to Araseki. Araseki discloses an echo suppression system for high frequency signal components which reduces the weaker of two signals by means of attenuators in the transmit and receive signal paths. However, the determination of which signal to suppress involves only a simple comparison of the strength of the two signals, rather than an analysis of the composition of the two signals. Moreover, Araseki discloses only two possible attenuation levels for the signals (i.e. attenuated and unattenuated), so that the attenuators effectively function as a voice switch.

An example of a hybrid echo cancellation and suppression system is disclosed in U.S. Pat. No. 5,313,498 to Sano. Sano discloses the use of an adaptive digital filter to cancel echoes. The circuit also includes a gain control circuit to reduce the gain of the received signal when the near-end party is talking if the ability of the adaptive filter to cancel echoes is exceeded. However, the determination of whether the near-end party or the far end party is speaking in the Sano patent is made by a simple comparison of the receive signal level with the transmit signal level, which can lead to incorrect results due to noise or echo effects. Moreover, the device disclosed by Sano does not correspondingly alter the transmit path gain when the near-end party is speaking, and does not alter either the transmit or receive path gain when the far-end party is speaking.

Yet another example of an echo suppression system is disclosed in U.S. Pat. No. 4,490,582 issued to Munson. Munson discloses a speakerphone circuit employing peak detectors in which the processing of talk signals and switch guard signals is partitioned in order to control complementary switched gain in the transmit and receive channels. A linear comparator/threshold switch combination is used to determine whether the device should be in transmit mode, receive mode or idle mode. Depending on the selected mode, one of two signals is sent to an attenuator control circuit, which adjusts the setting of a receive attenuator and a transmit attenuator accordingly. The inputs to the linear comparator include signals corresponding to the received signal less the transmitted signal and the microphone input signal less the loudspeaker output signal and noise. Thus, the control decision is based not just on a simple comparison of transmit signal level to receive signal level. However, Munson does not provide varying levels of control of the attenuators, nor does Munson take the total attenuation path into account when setting the attenuators. Moreover, Munson fails to take echo propagation delays into account, which could result in a loudspeaker echo being mistaken for transmitted speech.

U.S. Pat. No. 5,471,528 to Reesor discloses another echo suppression system for use in a speakerphone. Reesor discloses a handsfree audio circuit having separate receive and transmit paths with a controllable attenuator in each path and a separate monitoring circuit connected to each path. Each monitoring circuit, which senses the presence of audio on its respective path, comprises a peak detector and a speech detector. A direction comparator compares the outputs of the peak level detectors to produce directional control signals that determine which path has control. The device disclosed by Reesor requires that the audio input and output paths be sampled at a speech coding rate, however. The samples are then digitally processed in the monitoring and control circuits. This arrangement consumes a great deal of processing power, however. In a radiotelephone, the microprocessor may be unable to handle such a load since the microprocessor must also handle such tasks as call setup, processing and termination. To implement the device disclosed by Reesor, a radiotelephone would likely have to include a separate, dedicated microprocessor or digital signal processor. Thus, the device disclosed in Reesor would be prohibitively expensive to implement in a radiotelephone.

There is therefore a need in the art for a simple, inexpensive yet effective system for echo suppression in a handsfree radiotelephone that is particularly adapted for use in an automobile environment. In particular, there is a need for a half-duplex echo suppression system with an improved method for determining which path has control and for dynamically controlling the path gain of both the send path and the receive path.

SUMMARY OF THE INVENTION

Accordingly, an improved speakerphone having echo suppression is provided. Echo suppression is provided by means of an audio system comprising a transmit path, a receive path, and a control subsystem connected to each of the transmit path and the receive path. The control subsystem includes a pair of rectifiers for producing rectified signals indicative of the strength of the signals present on the receive path and the transmit path, respectively, and an analog-to-digital converter for generating digital samples of the rectified signals for further processing. The control subsystem further includes a general use microprocessor for receiving and processing samples of the rectified signals.

The audio system has three stable states, namely a transmit state, a receive state and an idle state. In the transmit state, the transmit path is least attenuated while the receive path is fully attenuated. Conversely, in the receive state, the receive path is least attenuated while the transmit path is fully attenuated.

Samples of the rectified signals are taken periodically and processed to determine if the receive path or the transmit path should have control (corresponding to a receive state and a transmit state, respectively), or if the audio system should be in an idle state.

Once the samples of the rectified signals are taken they are preprocessed to offset the effects of background noise and hardware-dependent biasing. The samples are then analyzed to determine if speech is present on either channel. If speech is detected on either channel (as indicated by the presence of acoustic energy in excess of a noise-dependent threshold), the samples are weighted depending on the current state of the audio system. The weighted samples are then analyzed to determine whether or not the state of the audio system should be changed (i.e. whether either of the receive or transmit channels should be given control).

In the idle state, both paths are equally attenuated. The audio system also has a number of transitional "going to idle" states, during which the audio system is heading toward the idle state after having previously been in a transmit state or a receive state. In a "going to idle" state, both paths are attenuated, although the control path is less attenuated than the other path and neither path is fully attenuated. For example if a path has been given control, then speech was detected on that path at some point. The control path is least attenuated and the other path is fully attenuated. If speech on the control path ceases, then instead of switching immediately to the idle state, the system switches to a going-to-idle state. In doing so, the path that has control is caused to be slightly more attenuated than before and the other path is caused to be slightly less attenuated than before. Unless speech is detected on one or both of the paths, the path attenuation levels are gradually moved towards their respective idle levels, and the audio system will eventually reach the idle state.

These and other aspects of the invention, together with features and advantages thereof will become apparent from the following detailed description when read with the accompanying drawings.

DETAILED DESCRIPTION OF THE PREFERRED EMBODIMENTS

The present invention will now be described with reference to the accompanying drawings, in which a preferred embodiment of the invention is shown. However, this invention may be embodied in many different forms and should not be construed as limited to the specific embodiment shown. Rather, the preferred embodiment is provided so that this disclosure is thorough and complete, and will fully convey the scope of the invention to those skilled in the art.

Figure 1:
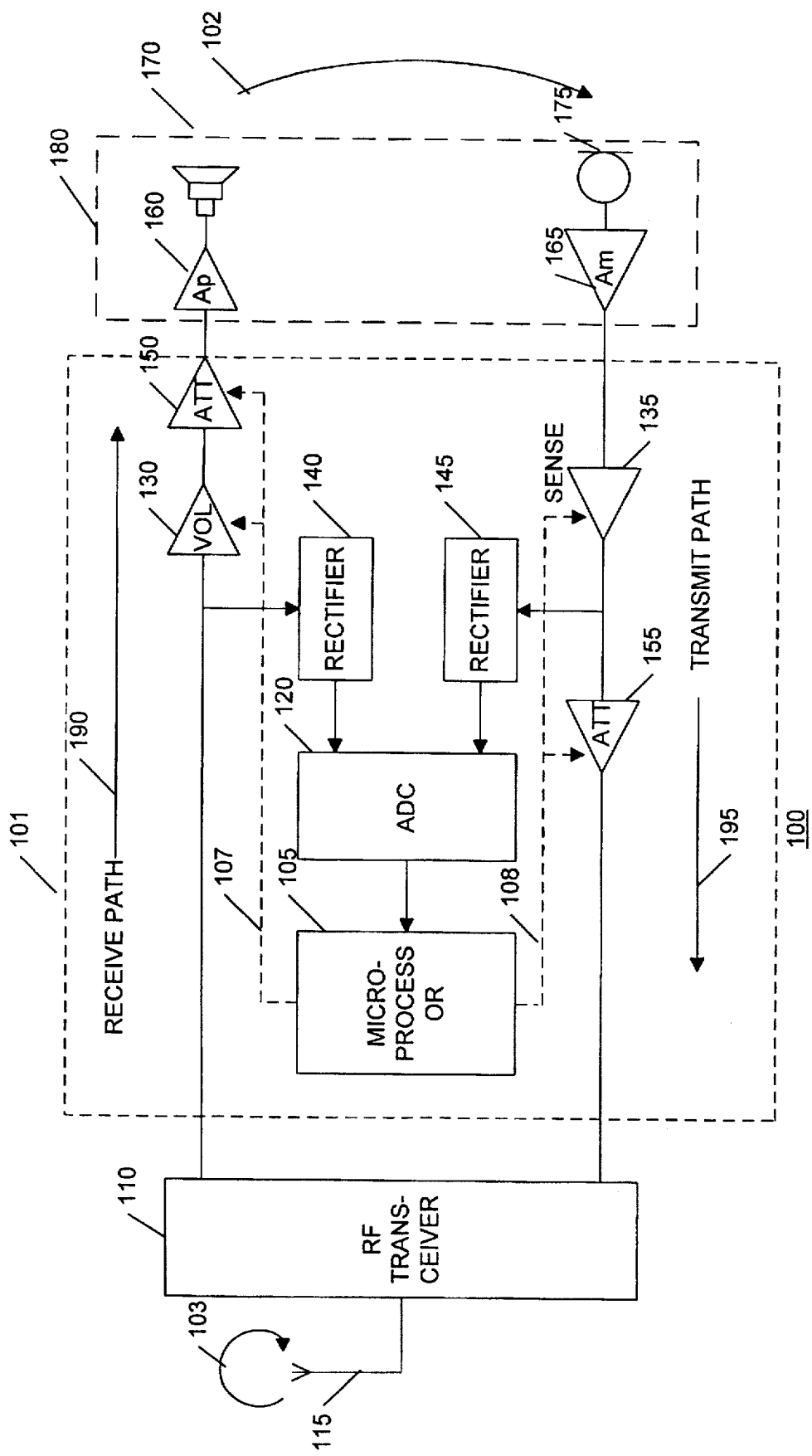
FIG. 1 is a block diagram of a radiotelephone having a handsfree circuit in accordance with an embodiment of the present invention.

Referring now to FIG. 1, a radiotelephone 100 having an RF transceiver unit 110 is shown. The radiotelephone has a receive audio path (or receive path) 190 by which signals received by RF transceiver 110 over antenna 115 are communicated to the near end party and a transmit audio path (or transmit path) 195 by which signals generated by the near end party are communicated to RF transceiver 110.

RF signals corresponding to audio signals transmitted by the far-end party are received by antenna 115 and processed by RF transceiver unit 110. The received signals are filtered and mixed by RF transceiver unit 110 to produce an analog electro-acoustical signal which is sent via receive path 190 to the audio control system 101 for amplification and output.

In the embodiment shown in FIG. 1, the radiotelephone 100 is attached to a handsfree adapter 180. Handsfree adapter 180 includes a loudspeaker power amplifier 160, a loudspeaker 170, an input preamplifier 165 and a microphone 175. A radiotelephone 100 typically has an on-board microphone and speaker (not shown) which are used during ordinary non-handsfree operation. However, when a handsfree adapter such as handsfree adapter 180 is attached to the radiotelephone 100, the radiotelephone's onboard microphone and speaker are bypassed, and audio signals are instead received from and transmitted to the microphone 175 and loudspeaker 170, respectively.

Thus, audio signals received by microphone 175 are amplified by input power amplifier 165 and transmitted via the transmit path 195 to the audio control system 101 of radiotelephone 100. Audio signals transmitted from the audio control system 101 over receive path 190 are amplified by loudspeaker power amplifier 160 and broadcast over loudspeaker 170.

Audio control system 101 includes microprocessor 105, analog-to-digital converter (ADC) 120, rectifiers 140 and 145, volume control amplifier 130, input sense amplifier 135, receive attenuator 150 and transmit attenuator 155.

Microprocessor 105 controls the operation of volume control amplifier 130, input sense amplifier 135, and receive attenuator 150 and transmit attenuator 155 by means of control lines 107 and 108, which may comprise a portion of the radiotelephone's system bus (not shown).

Attenuators 150 and 155 are microprocessor controlled variable attenuators; each is capable of attenuating its respective path by 49 dB in 8 steps of 7 dB per step. The attenuation level of each attenuator 150, 155 is set by microprocessor 105.

Volume control amplifier 130 and input sense amplifier 135 are also controlled by microprocessor 105. Volume control amplifier 130 varies the volume of the audio signal that is broadcast over loudspeaker 170. The gain of volume control amplifier 130 is adjustable in 8 steps of 3 dB each. The input sense amplifier controls the sensitivity of microphone 175. The gain of input sense amplifier 135 is adjustable in 3 steps of 4 dB each. The settings of volume control amplifier 130 and input sense amplifier 135 may be preset according to user preference via a menu option or control button or dial on the radiotelephone. However, it should be recognized that the input sense amplifier 165 is not necessary to the present invention.

Audio signals received by RF transceiver unit 110 over antenna 115 are transmitted via receive path 190 to audio control unit 101. The received audio signal is amplified by volume control amplifier 130 and then attenuated by receive attenuator 150 according to their respective attenuation settings. The signal is then output to the handsfree unit 180, where it is amplified by power amplifier 160 and broadcast over loudspeaker 170.

Audio signals received by microphone 175 are amplified by preamplifier 165 and transmitted to the audio control system 101 of radiotelephone 100 via transmit path 195. The audio signal is first amplified by input sense amplifier 135 and then attenuated by transmit attenuator 155 according to their respective attenuation settings. The transmit audio signal is then sent via transmit path 195 to the RF transceiver unit 110 for RF transmission to a remote receiver. Audio signals received by microphone 175 may include audio signals coupled from loudspeaker 170 via path 102.

Audio signals detected by input sense amplifier 135 are also passed to rectifier 145, which generates a signal $T_{rect}(t)$ indicative of the signal strength of the audio signal on the transmit path 195 prior to attenuation by transmit attenuator 155. Preferably, the transmit path signal is provided to rectifier 145 for measurement prior to amplification by input sense amplifier 135. However, in the embodiment described, it is provided after amplification by input sense amplifier 135. The rectified signal $T_{rect}(t)$ is provided to ADC 120 for further processing.

Similarly, audio signals received by the audio control system on receive path 190 from RF transceiver unit 110 are supplied to rectifier 140, which generates a signal $R_{rect}(t)$ which is indicative of the signal strength of the audio signal on the receive path 190 prior to amplification by volume control amplifier 130 or attenuation by receive attenuator 150. The audio signal on the receive path 190 may include network echoes or other echoes caused by reflections or acoustical coupling at the remote end of the call, as indicated by path 103.

The rectified signal $R_{rect}(t)$ is provided to ADC 120 for further processing. Rectified signals $T_{rect}(t)$ and $R_{rect}(t)$ are generally referred to herein as rectified signal $U_{rect}(t)$. The signals input to the rectifiers are generally referred to herein as $U_{in}(t)$.

The strength of the signal on the receive path should be measured prior to attenuation and volume control so that background noise is not amplified prior to measurement by rectifier 140. Measuring the signal after attenuation or volume control could lead to incorrect estimation of noise levels due to the fact that amplifier 130 and attenuator 150 have variable gain and attenuation levels, respectively. Transmit signal strength should be measured before attenuation by attenuator 155. In a preferred embodiment, transmit signal strength is measured before amplification by input sense amplifier 135.

Under the control of microprocessor 105, ADC 120 alternately samples the rectified signals $R_{rect}(t)$ and $T_{rect}(t)$ at a predetermined sampling interval which, in a preferred embodiment is 24 ms total, or 12 ms per sample. The digital samples are provided to microprocessor 105 which processes the samples according to a process described in detail below to determine how to set the attenuation levels of receive attenuator 150 and transmit attenuator 155 for optimum echo suppression. In one embodiment, ADC 120 is implemented within microprocessor 105. In another embodiment, ADC 120 is implemented as a separate integrated circuit.

Figure 2:
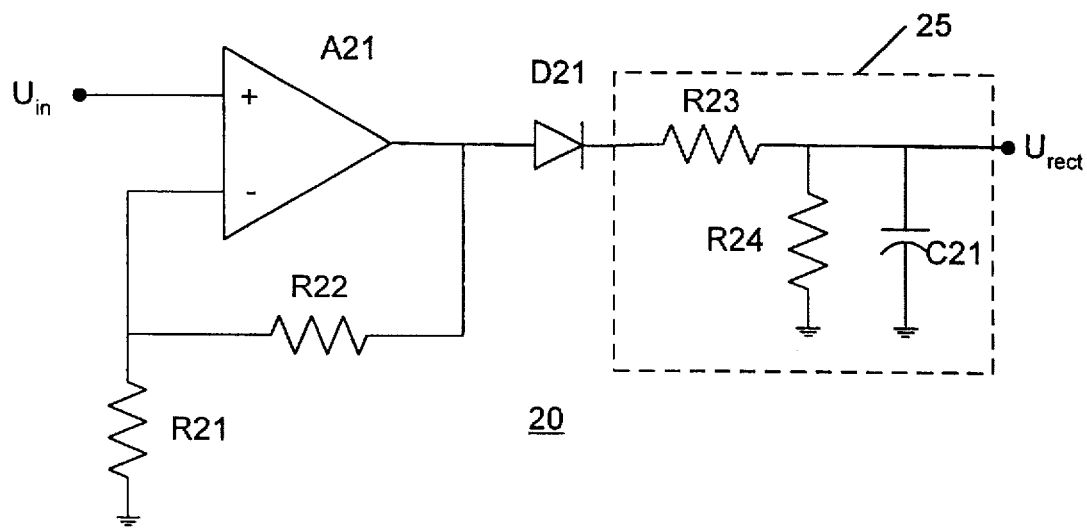
FIG. 2 is a circuit diagram of a rectifier circuit.

FIG. 2 illustrates a preferred embodiment of a rectifier circuit 20 which may be used to implement rectifiers 140, 145 according to the present invention. A rectifier circuit 20 has an amplifier A21 of standard design having a noninverting input, an inverting input and an output. An input line for a signal $U_{in}(t)$ is connected to the noninverting input. The inverting input is coupled to ground through resistor R21. The inverting input is also coupled to the output of the amplifier A21 via feedback resistor R22. The output of amplifier A21 is passed through a rectifying diode D21 and into a filter network 25 comprising a series-coupled resistor R23, a parallel-coupled resistor R24 and a parallel-coupled capacitor C21. The output of rectifier circuit 20 is the rectified signal $U_{rect}(t)$, which provides an indication of the signal strength of input signal $U_{in}(t)$.

The gain of amplifier A21 is determined by the resistance of resistors R21 and R22 according to the following equation:

$$G = 1 + \frac{R22}{R21}$$

In a preferred embodiment, the gain of amplifier A21 is calibrated such that ADC 120 produces a value of 0x40 at high levels of background noise in the intended environment, where the value 0x00 represents the minimum output value of ADC 120.

The circuit values of resistors R23 and R24 and capacitor C21 in the filter network determine the attack time $t_a$ and the decay time $t_d$ of rectifier circuit 20 according to the following equations:

$$t_a = -ln(0.1)*(R23)*(C21)$$

$$t_d = -ln(0.1)*(R24)*(C21)$$

In a preferred embodiment, resistor R23 has a resistance of 68 kΩ, resistor R24 has a resistance of 560 kΩ, and capacitor C21 has a capacitance of 68 nF.

The attack time $t_a$ determines how quickly the output voltage $U_{rect}(t)$ responds to an increase in the signal energy of input signal $U_{in}(t)$. Conversely, the decay time $t_d$ determines how quickly $U_{rect}(t)$ responds to a decrease in the signal energy of $U_{in}(t)$. In a preferred embodiment, the attack time $t_a$ is approximately 10 ms, while the decay time $t_d$ is approximately 85 ms.

Having a relatively fast attack time means that the output signal $U_{rect}(t)$ will respond relatively quickly to a sudden increase in signal energy, such as occurs at the onset of speech. Having a relatively slow decay time means that $U_{rect}(t)$ will not fall quickly during small pauses which occur naturally during speech.

It is desirable that rectifiers 140 and 145 have the same DC output levels for the same input signal strengths, because the sampled rectified signals will ultimately be compared with one another to determine which path should have control.

Rectifier circuit may be implemented as an application specific integrated circuit (ASIC). An example of a suitable ASIC is Part No. ROP 101 687/C produced by Plessey and Dialog.

Figure 3:
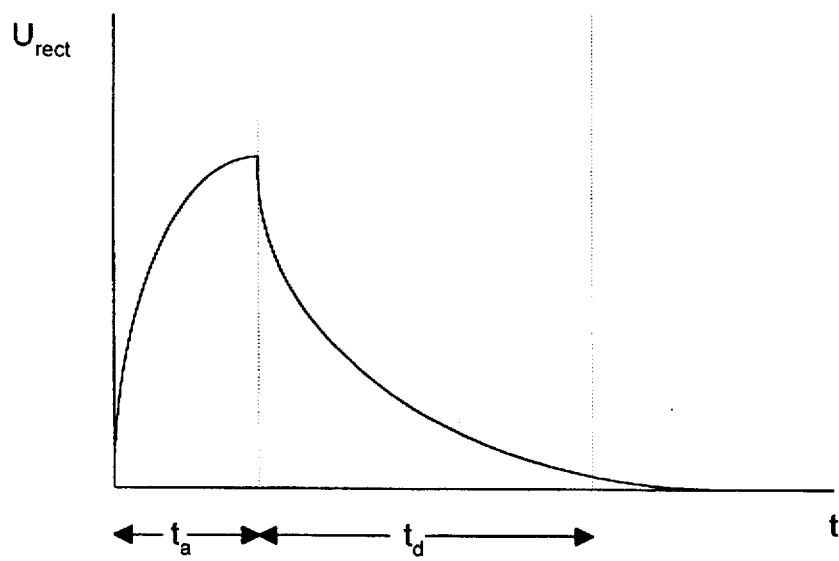
FIG. 3 is a graph showing the output of the rectifier circuit of FIG. 2 for a constant energy input signal of duration $t_a$.

FIG. 3 illustrates the operation of rectifier circuit 20. FIG. 3 is a graph of $U_{rect}(t)$ versus time following a sudden increase of energy in $U_{in}(t)$ at time t=0 which lasts for $t_a$ seconds. Upon the increase in energy of $U_{in}(t)$, the value of $U_{rect}(t)$ begins to rise at a steep rate. When the energy of $U_{in}(t)$ falls at time $t=t_a$, the value of $U_{rect}(t)$ falls at a slow rate of decay.

Figure 4:
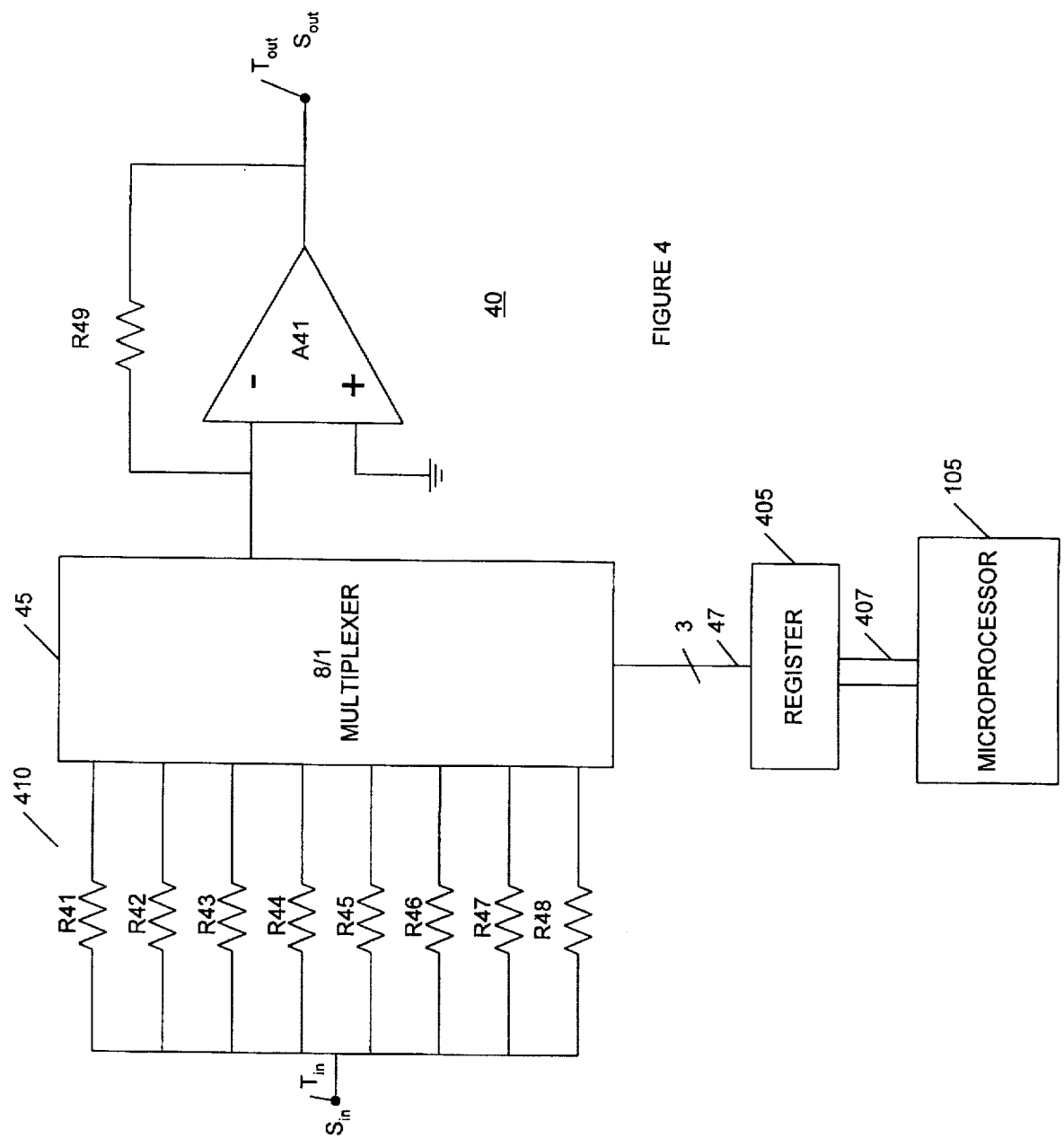
FIG. 4 is a circuit diagram of a programmable attenuator having eight settings.

A variable attenuator circuit 40 is illustrated in FIG. 4. In a preferred embodiment, variable attenuator circuit 40 is used to implement attenuators 150, 155. Variable attenuator circuit 40 includes an input terminal $T_{in}$ to which an input signal $S_{in}$ is applied. A resistor network 410 includes eight resistors R41–R48 coupled between input terminal $T_{in}$ and eight input lines of an 8/1 multiplexer 45 of standard design, respectively. The output line of multiplexer 45 is fed into the inverting input of an amplifier A41 of standard design. The noninverting input of amplifier A41 is coupled to ground, and the output of amplifier A41 is fed back to its inverting input through a feedback resistor R49.

The attenuation (gain) of attenuation circuit 40 is calculated according to the following equation:

$$G = -\frac{R49}{R4X}$$

where R4X is selected from resistor network 410 by multiplexer 45. This arrangement permits attenuator circuit 40 to be adjusted among eight different attenuation levels. In a preferred embodiment, the attenuation level of attenuator circuit 40 may be varied between 0 and −49 dB in 7 dB steps designated as steps 0–7.

The selection of an attenuation controlling resistor by multiplexer 45 is controlled by control lines 47 which read a value from register 405. The contents of register 405 are set by microprocessor 105. Thus, by altering the contents of register 405 via system bus 407, microprocessor 105 controls the attenuation level of attenuator circuit 40.

Figure 5A:
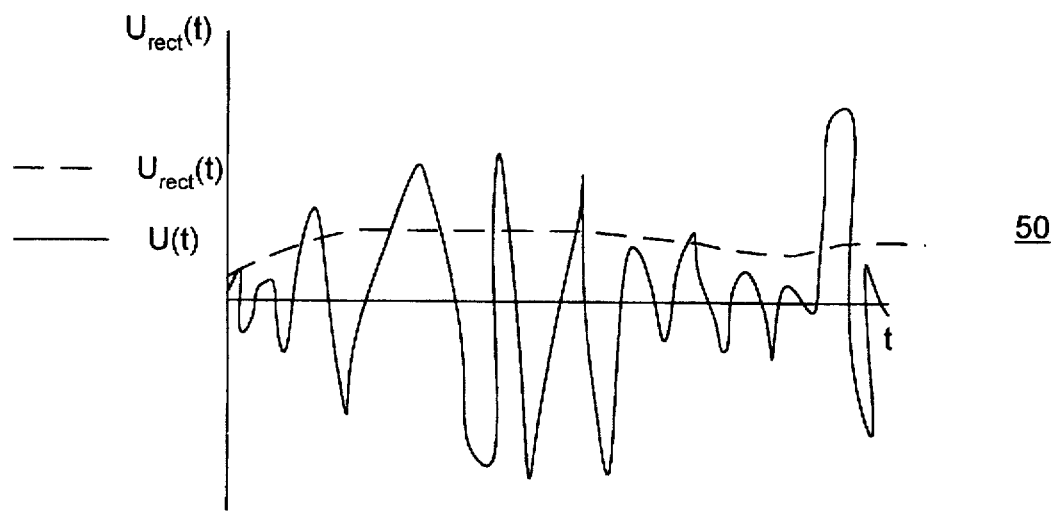
FIG. 5A is a graph showing representative input and output voltage signals of the rectifier of FIG. 2.

FIG. 5A shows a plot of a representative signal U(t) versus time superimposed upon a corresponding rectified signal $U_{rect}(t)$ in graph 50. Rectified signal $U_{rect}(t)$ responds to increases and decreases in the signal energy of U(t).

Figure 5B:
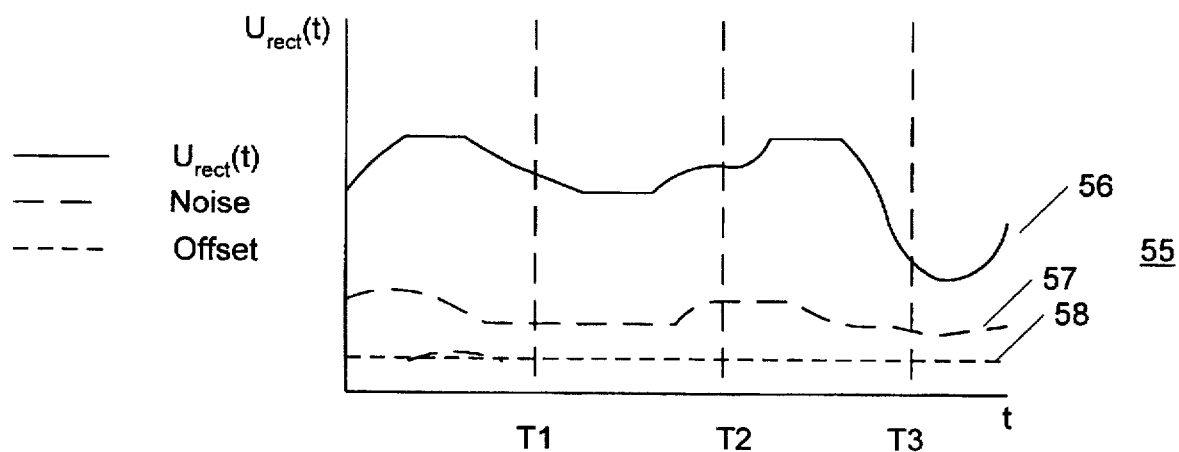
FIG. 5B is a graph showing the composition of a representative output signal of the rectifier of FIG. 2.

FIG. 5B illustrates the composition of rectified signal $U_{rect}(t)$, depicted as curve 56 in graph 55. A portion of the output level of $U_{rect}(t)$ is the result of a calibration level that depends on the tolerances of the particular hardware being used. The calibration level, or offset level, is generally constant and is illustrated as curve 58 in FIG. 5B. Some of the detected signal energy which $U_{rect}(t)$ represents is caused by the presence of background noise in the input signal U(t). The background noise level is generally depicted in FIG. 5B as curve 57. Thus, the actual speech signal energy represented by $U_{rect}(t)$ corresponds to the difference between curve 56 and curve 57. Put in equation form, $$\underline{U}_{rect}(t) = U_{rect}(t) - (BN(t) + \text{Offset})$$

where $\underline{U}_{rect}(t)$ represents the speech energy component of $U_{rect}(t)$, $BN(t)$ represents the background noise contribution to the input signal level, and Offset is equal to the calibration or offset level calculated for the particular rectifier. If the result of the foregoing calculation is less than zero, then $\underline{U}_{rect}(t)$ is set equal to zero (i.e. $\underline{U}_{rect}(t)$ can never be a negative number). Estimation of background noise level and Offset is described in detail further below.

Microprocessor 105 periodically causes ADC 120 to sample rectified signals $T_{rect}(t)$ and $R_{rect}(t)$. In the described embodiment, ADC 120 can sample only one signal at a time; thus, rectified signals $T_{rect}(t)$ and $R_{rect}(t)$ must be sampled in serial fashion. As noted above, $T_{rect}(t)$ and $R_{rect}(t)$ are preferably sampled in 12 ms intervals for a total sampling period of 24 ms. After sampling one of the rectified signals, ADC 120 outputs an 8-bit digital value to microprocessor 105, which corresponds to the DC value of the sampled signal. The digital converted sample provided to microprocessor 105 thus has a hexadecimal value of between x00 and xFF.

Figure 6:
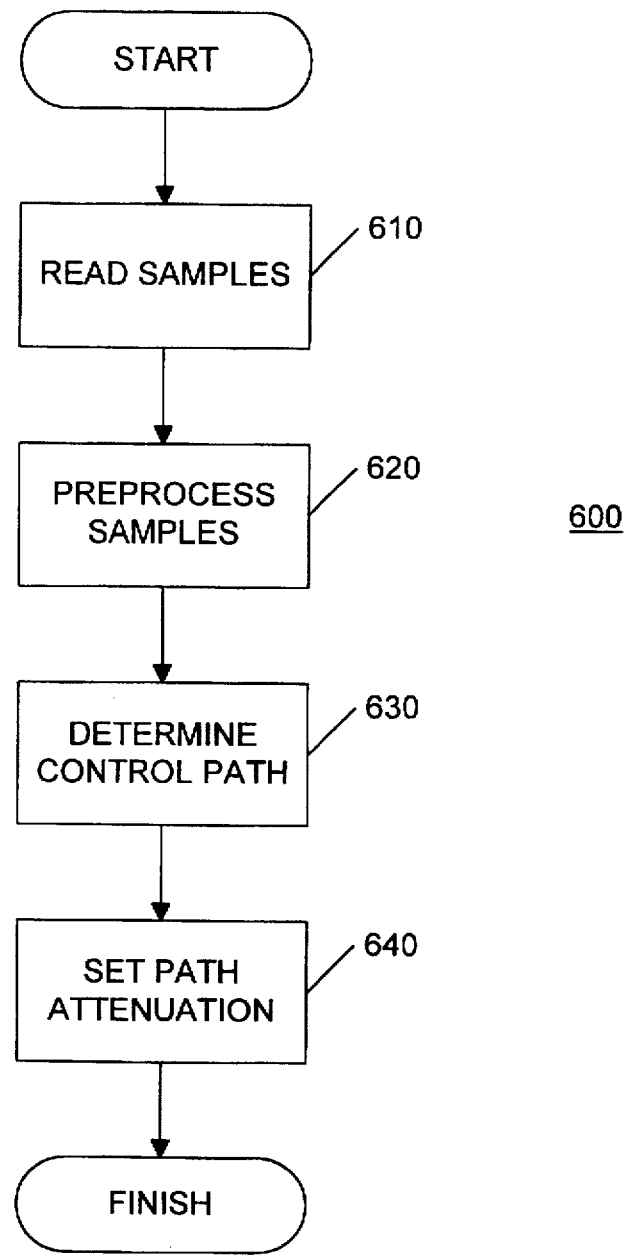
FIG. 6 is a flowchart showing the operation of an aspect of the present invention.

Microprocessor 105 then processes the sampled rectified signals and controls the operation of audio control circuit 101 in response thereto. During every 24 ms interval, microprocessor 105 follows the process 600 illustrated in FIG. 6. In step 610, microprocessor 105 reads the sampled values of $T_{rect}(t)$ and $R_{rect}(t)$ from ADC 120. Next, in step 620, microprocessor 105 preprocesses the sampled values to remove the offset and background noise components of the sampled values. The microprocessor 105 also stores certain information for use in estimating background noise and offset levels, which is performed as part of a separate process.

In step 630, microprocessor 105 determines which path should have control based on the current state of the audio control system and the most recently sampled values or previously sampled values. Finally, microprocessor 105 sets the path attenuation for the transmit path 195 and receive path 190 in step 640 by setting the attenuation levels of attenuators 150, 155.

Figure 7A:
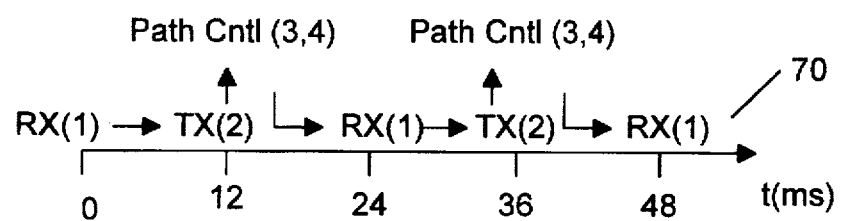
FIGS. 7A & 7B are a timing diagram showing the timing of the sampling, path control and background noise calculation aspects of the present invention.

Sample timing is shown in FIG. 7A, which illustrates the following operations:

(1) Sample $R_{rect}(t)$ to measure receive path; store digital value in RXSAMPLE register.

(2) Sample $T_{rect}(t)$ to measure transmit path; store digital value in TXSAMPLE register.

(3) Set path control; manipulate measured values to determine path control.

(4) Set attenuation levels; adjust attenuation levels of transmit and receive attenuators.

As shown in FIG. 7A, path measurements occur every 12 ms alternating between the receive path and the transmit path. After the transmit path is measured, the processor performs path control functions and path switching functions.

Figure 7B:
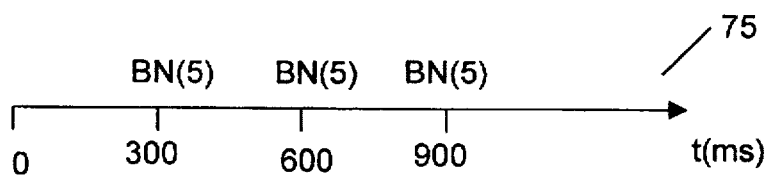

Background noise calculation timing is illustrated in FIG. 7B. As shown in FIG. 7B, background noise levels are recalculated every 300 ms, as indicated by state (5).

Steps 620 through 640 of process 600 will now be described in detail.

Sample Preprocessing

Figure 8:
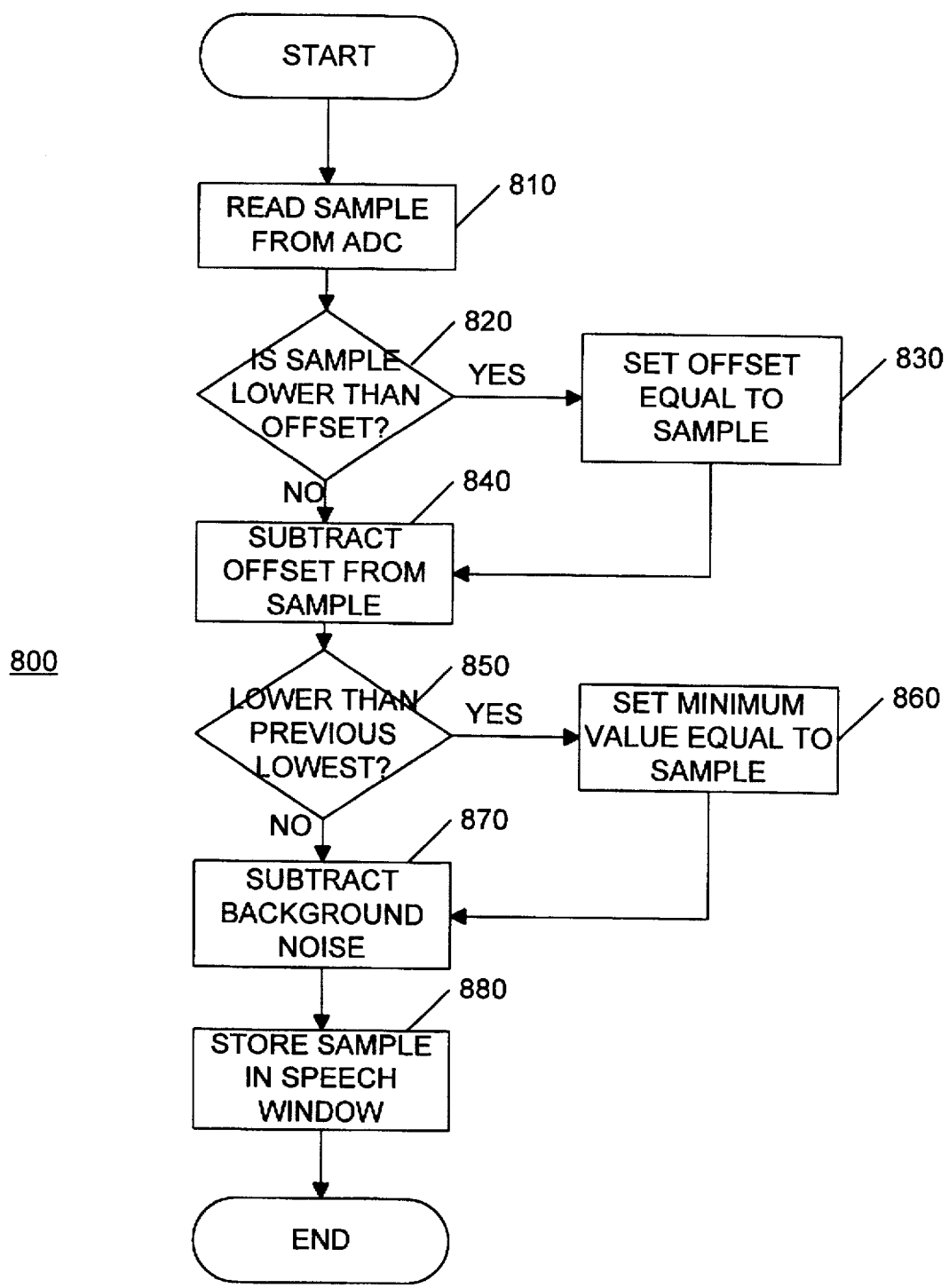
FIG. 8 is a flowchart showing an embodiment of the sample preprocessing operation of the present invention.

The sample preprocessing operation (step 620 in FIG. 6) is illustrated in FIG. 8. Although illustrated for the receive samples only, the process illustrated in FIG. 8 is equally applicable to transmit sample preprocessing.

In step 810, the microprocessor reads the sampled value of $R_{rect}(t)$ and stores it in a register designated RXSAMPLE. At the point, the value of RXSAMPLE may include speech, noise and offset components. The noise and offset components are removed in steps 820–870.

In step 820, the value stored in RXSAMPLE is compared to a prestored value of RXOFFSET, which is the estimated calibration level associated with rectifier 140. The prestored value of OFFSET may be a factory set value or a calibration value calculated in a manner described below.

If RXSAMPLE is less than RXOFFSET, then RXOFFSET is set equal to RXSAMPLE in step 830. This is because RXOFFSET is assumed to be the lowest level that can possibly be output by rectifier 140. If a lower value is measured (i.e. if RXSAMPLE<RXOFFSET), then the RXOFFSET estimate is revised downward to be equal to RXSAMPLE. The value of RXOFFSET is then stored in nonvolatile memory (such as EEPROM) to be used after the radiotelephone is powered off and back on. In a preferred embodiment, RXOFFSET is preset to a hexadecimal value of 0xFF.

Next, in step 840, the RXSAMPLE value is adjusted by subtracting RXOFFSET from RXSAMPLE.

In step 850, the value of RXSAMPLE is compared to a previously stored temporary minimum value. Temporary minimum values are stored for purposes of background noise calculation, and are reset each time background noise calculation occurs (i.e. every 300 ms in the preferred embodiment). Temporary minimum values are stored in a register designated RX_TEMP_MIN.

If the value of RXSAMPLE is less than the previously stored minimum sample (i.e. if RXSAMPLE<RX_TEMP_MIN), then in step 860 the value of RX_TEMP_MIN is revised downward to be equal to RXSAMPLE (which has already had the offset removed in step 840).

Next, the background noise level is removed from RXSAMPLE in step 870 by subtracting the value stored in a register designated RX_BACKGND from RXSAMPLE, provided, however, that if RXSAMPLE is less than RX_BACKGND, RX_SAMPLE is set equal to zero. The register RX_BACKGND contains the most recently calculated value of the estimated receive path background noise level.

The modified RXSAMPLE value is then stored in a rolling speech window (designated RX_WINDOW) in step 880. The speech window is implemented as a first-in-first-out queue which saves the most recent samples for processing. The receive window size is preferably between 100–120 ms in length, which corresponds to the approximate duration of receive path echoes (i.e. electrical network echoes). Thus, for a 24 ms sampling interval, the receive window must be sized to hold at least five sample values.

The transmit window size is preferably in the range of 60–80 ms, which corresponds to the approximate duration of echoes in an automobile interior. The transmit window buffer must therefore be sized to hold at least four sample values.

Table 1 summarizes the various registers used by microprocessor 105 in performing the foregoing calculations.

TABLE 1

Register Descriptions

| REGISTER | DESCRIPTION |
| --- | --- |
| RXSAMPLE | Receive sample value |
| TXSAMPLE | Transmit sample value |
| RXOFFSET | Receive path offset value |
| TXOFFSET | Transmit path offset value |
| RX_TEMP_MIN | Temporary minimum receive sample value |
| TX_TEMP_MIN | Temporary minimum transmit sample value |
| RX_BACKGND | Estimated receive background noise level |
| TX_BACKGND | Estimated transmit background noise level |
| RX_WINDOW | Receive window (pointer) |
| TX_WINDOW | Transmit window (pointer) |

Those skilled in the art will recognize that the foregoing described registers may be implemented as hardware registers within microprocessor 105 or as memory locations addressable by microprocessor 105.

It is apparent from the description of FIG. 8 that the values of RX_OFFSET and TX_OFFSET can only be adjusted downward. These values may be periodically reset to a factory default level to account for changes in the operating parameters of the rectifier hardware. For example, the values of TX_OFFSET and RX_OFFSET may be reset to factory default estimates after every 100 hours of operation, and/or by user command, and/or each time the telephone is placed in handsfree mode.

Figure 9:
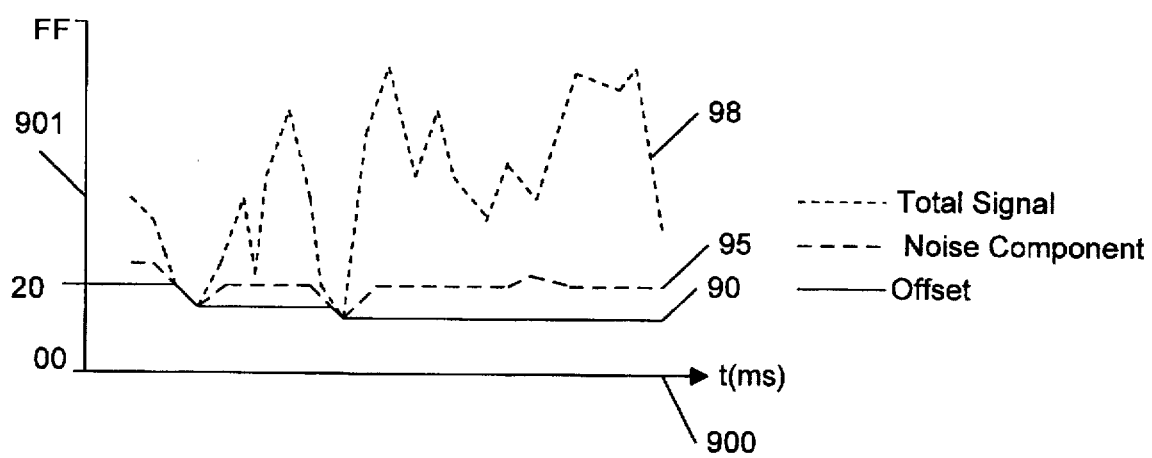
FIG. 9 is a graph showing the effect of changes in rectifier output to the operating parameters of the present invention.

FIG. 9 is a graphic illustration of the operation of the process described above. In the graph shown in FIG. 9, the abscissa 900 (or x-axis) represent-time, while the ordinate 901 (y-axis) represents hexadecimal sample values. The following curves are depicted in FIG. 9:

90—Rectifier offset value

95—Background noise plus rectifier offset

98—Speech, background noise and rectifier offset

Thus, the distance V1 represents the rectifier offset value, V2 represents the background noise level and V3 represents the speech level. Note that each time curve 98 (corresponding to the total speech, background noise and offset components) drops below the previous offset level, the offset level is adjusted downward accordingly.

Path Control Determination

Figure 10:
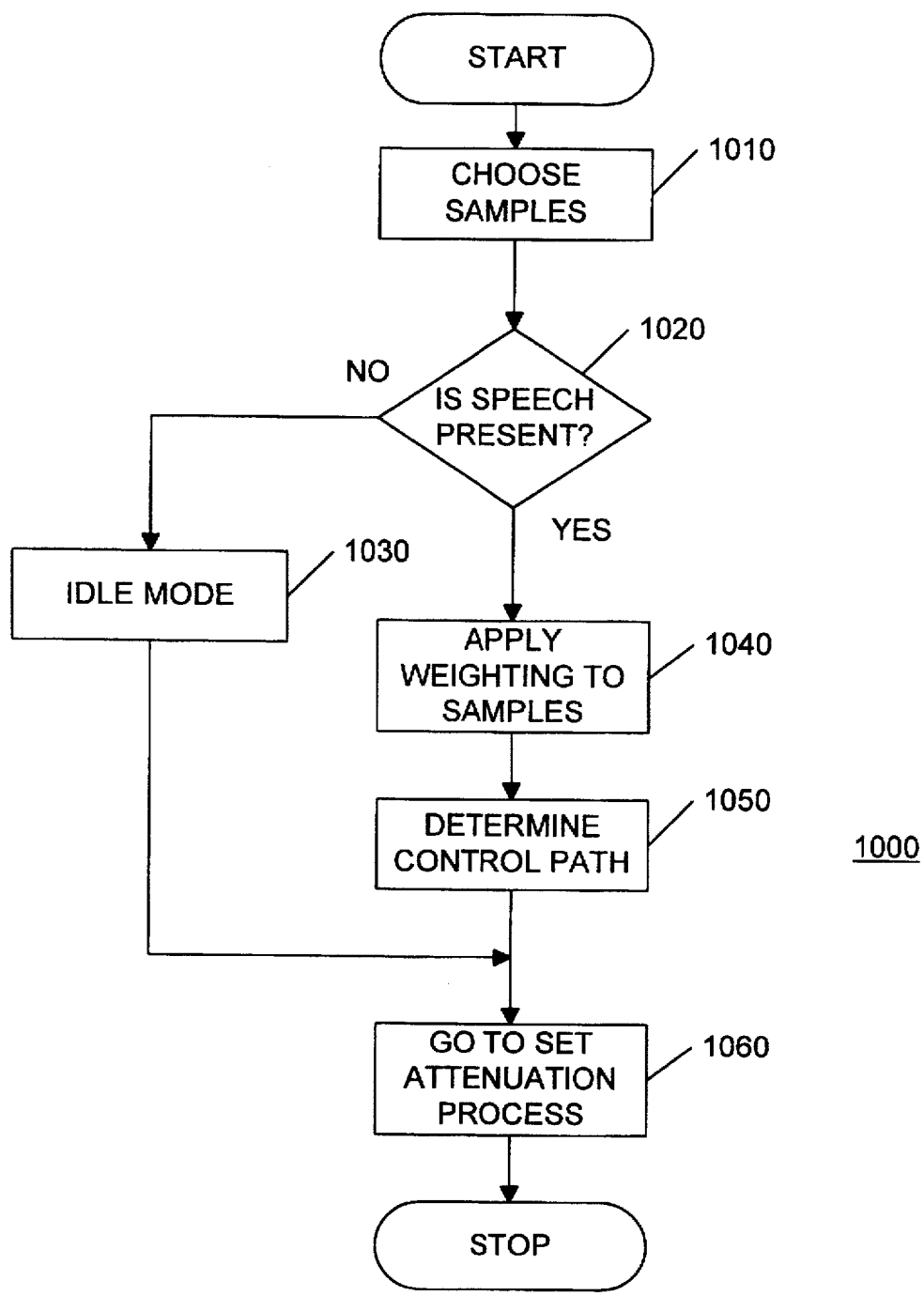
FIG. 10 is a flowchart showing an embodiment of the sample calculation and path attenuation operations of the present invention.

The process of determining the control path (step 630 from FIG. 6) is illustrated as process 1000 in FIG. 10.

First, in step 1010, samples are chosen from the receive window RX_WINDOW and the transmit window TX_WINDOW for processing. Depending on the state of the system, the most recent samples may or may not be chosen for processing. The sample selection process of step 1010 is described more fully below in connection with FIG. 11.

Next, in step 1020, microprocessor 105 determines whether speech is present on either the transmit path 195 or the receive path 190.

Speech is detected by comparing the value of RX_RESULT with the receive path speech threshold RX_THRESH and by comparing TX_RESULT with the transmit path speech threshold TX_THRESH. The calculation of RX_THRESH and TX_THRESH is described in detail below. If RX_RESULT exceeds RX_THRESH or TX_RESULT exceeds TX_THRESH, then speech has been detected.

If no speech is present on either path, the audio control system is stepped toward idle mode in step 1030 (or, if already in idle mode, the system is left in idle mode), and the microprocessor 105 moves to the Set Path Attenuation process (step 640 of FIG. 6) in step 1060.

If speech is detected on either path in step 1020, then the microprocessor 105 weights the samples in step 1040 according to a process described below in connection with FIG. 12. Once the samples have been weighted, the microprocessor 105 determines which path should have control of the system in step 1050. Finally, in step 1060, the microprocessor moves the Set Path Attenuation process.

Figure 11:
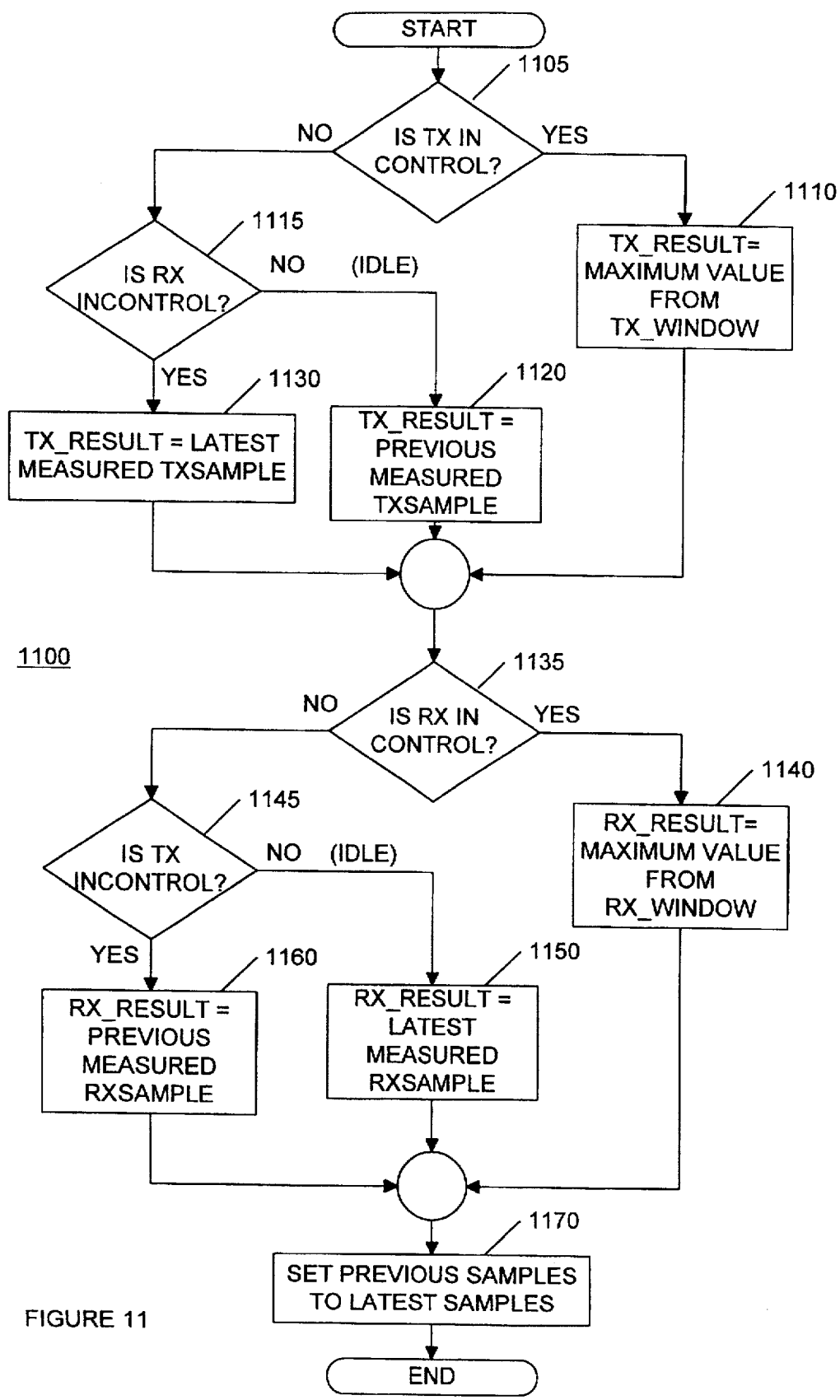
FIG. 11 is a flowchart showing an embodiment of the sample selection operation of the present invention.

The process of choosing samples for processing is illustrated in FIG. 11. The samples chosen for further processing are designated RX_RESULT and TX_RESULT. The samples choice process ensure that valid samples are used in the speech detection process.

Table 2 describes the registers used in the calculation of RX_RESULT and TX_RESULT.

TABLE 2

Attenuation setting registers

| Register | Description |
| --- | --- |
| TX_ATT | Transmit path attenuation setting |
| RX_ATT | Receive path attenuation setting |
| TX_IDLE | Transmit path idle attenuation setting; equal to 1/2 of the maximum transmit level |
| RX_IDLE | Receive path idle attenuation setting; equal to 1/2 the maximum receive level |

In steps 1105–1130, the value of TX_RESULT is chosen by examining the current transmit and receive path attenuation settings. In step 1105, the microprocessor determines whether the transmit path 195 has control by comparing the current transmit attenuation setting TX_ATT to the transmit idle level TX_IDLE. If TX_ATT is less than TX_IDLE (i.e. the current attenuation setting is less than the idle setting), then the transmit path must have control. The process advances to step 1110, where the TX_RESULT is set equal to the maximum sample from the transmit speech window TX_WINDOW. This ensures that, if the transmit path is in control, then the strongest recent transmit path sample is chosen for processing, even if it is not the most recent sample. The process then proceeds to step 1135.

If, in step 1105, it is determined that the transmit path 195 does not have control (i.e. TX_ATT>=TX IDLE), the process advances to step 1115, where the microprocessor 105 determines if the receive path has control by again comparing the current transmit path attenuation setting TX_ATT to TX_IDLE. If TX_ATT is greater than TX_IDLE, then the receive path must have control, and the process advances to step 1130. In step 1130, the TX_RESULT register is set equal to the latest measured transmit sample TXSAMPLE. If TX_ATT is not greater than TX_IDLE (i.e. TX_ATT is equal to TX_IDLE), this indicates that the system is in idle state, and the process proceeds from step 1115 to step 1120, where TX_RESULT is set equal to the previous (i.e. next to last) measured TXSAMPLE from the transmit window.

The process then proceeds to steps 1135–1170, wherein the value of RX_RESULT is chosen. In step 1135, the microprocessor determines whether the receive path 190 has control by comparing the current receive attenuation setting RX_ATT to the receive idle level RX_IDLE. If RX_ATT is less than RX_IDLE (i.e. the current attenuation setting is less than the idle setting), then the receive path must have control. The process advances to step 1140, where the RX_RESULT is set equal to the maximum sample from the receive speech window RX_WINDOW. This ensures that, if the receive path is in control, then the strongest recent receive path sample is chosen for processing; even if it is not the most recent sample. The process then proceeds to step 1170.

If, in step 1135, it is determined that the receive path does not have control (i.e. RX_ATT>=RX_IDLE), the process advances to step 1145, where the microprocessor 105 determines if the transmit path has control by again comparing the current receive path attenuation setting RX_ATT to RX_IDLE. If RX_ATT is greater than RX_IDLE, then the transmit path must have control, and the process advances to step 1160. In step 1160, the RX_RESULT register is set equal to the previous measured receive sample RXSAMPLE. If RX_ATT is not greater than RX_IDLE (i.e. RX_ATT is equal to RX_IDLE), this indicates that the system is in idle state, and the process proceeds from step 1145 to step 1150, where RX_RESULT is set equal to the latest (i.e. next to last) measured RXSAMPLE from the receive window.

Table 3 summarizes the results of the process illustrated in FIG. 11.

TABLE 3

Summary of Sample Choice Process

| State | RX_RESULT | TX_RESULT |
| --- | --- | --- |
| IDLE | Latest measured value of RXSAMPLE | Previous measured value of TXSAMPLE |
| RX in Control | Max sample from RX_WINDOW | Latest measured value of TXSAMPLE |
| TX in Control | Previous measured value of RXSAMPLE | Max sample from TX_WINDOW |

Table 4 describes the various registers used in the sample choice process.

TABLE 4

Additional register descriptions

| Register | Description |
| --- | --- |
| TX_ATT | Transmit path attenuation setting |
| RX_ATT | Receive path attenuation setting |
| TX_IDLE | Transmit path idle level (constant) |
| RX_IDLE | Receive path idle level (constant) |
| TX_RESULT | Chosen transmit sample |
| RX_RESULT | Chosen receive sample |

Due to the 12 ms delays involved in sampling each path, it is not always ideal to use the latest sample from each path to detect speech. For example, it is possible that sound could be received on the receive path 190 and broadcast by loudspeaker 170 immediately after the receive path 190 has been sampled. The sound broadcast by the loudspeaker 170 could be picked up by the microphone 175 in time to be sampled on the transmit path 195.

If the audio control system is in idle state, the value chosen for TX_RESULT is not the latest value of TXSAMPLE but the next-to-latest value. If the speech was in fact initiated at the near end (i.e. it was not an echo), it will be interpreted as valid speech at the next sampling interval (i.e. 24 ms later). Similarly, if the transmit path has control, the latest measured RXSAMPLE is not chosen. Rather, the previous (or next to last) value of RXSAMPLE is chosen in order to account for a strong network echo.

Once the samples have been chosen, they are analyzed to determine whether speech is present on either channel (step 1020 from FIG. 10). This is done by comparing each chosen sample (RX_RESULT and TX_RESULT) to determine if either is greater than its respective speech threshold, denoted RX_THRESH and TX_THRESH. If so, then speech has been detected, and the audio control system proceeds to apply weighting to the samples (step 1040 from FIG. 10). The values of RX_THRESH and TX_THRESH are determined by the background noise level in a manner described in detail below. If no speech is detected, then the system is stepped toward idle mode. That is, the values of the receive attenuation RX_ATT and transmit attenuation TX_ATT are moved one step closer to RX_IDLE and TX_IDLE, respectively. Thus, the system does not immediately fall back into idle mode if no speech is detected in one sampling interval. Such a result would be undesirable, since small pauses occur naturally in conversation, and immediately returning to the idle state in such an event would distort a speaker's voice.

Figure 12:
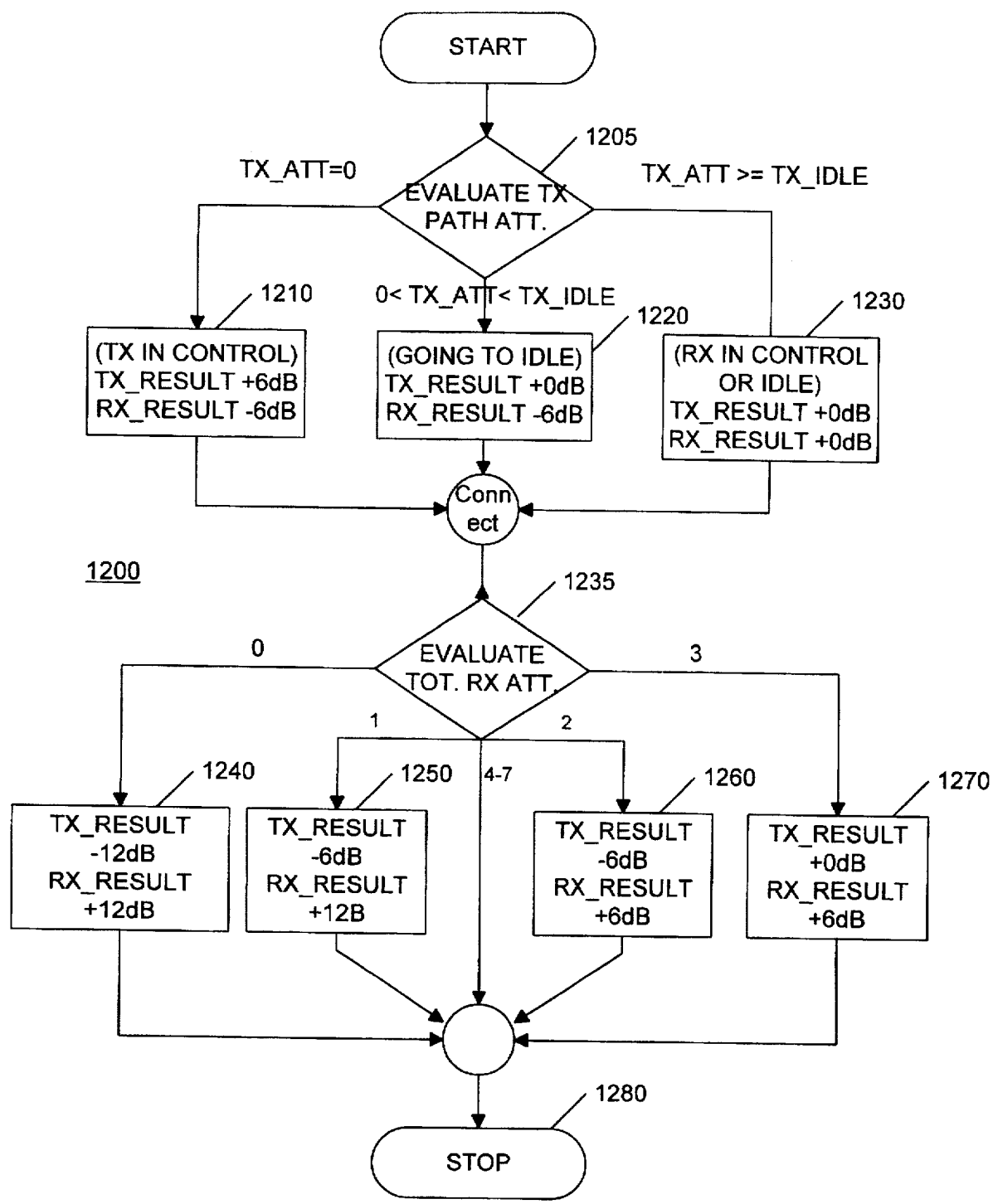
FIG. 12 is a flowchart showing an embodiment of the sample weighting operation of the present invention.

The process of sample weighting is illustrated in FIG. 12. In step 1205, the value of TX_ATT is checked to determine if it is equal to zero, greater than zero but less than TX_IDLE, or greater than or equal to TX_IDLE.

If TX_ATT is equal to 0, then the transmit path has control. In that case, then TX_RESULT is adjusted upwards in step 1210 by approximately 6 dB and RX_RESULT is adjusted downward by approximately 6 dB. The 6 dB adjustments may be performed by simply left shifting the contents of the appropriate register in microprocessor 105 (in the case of an upward adjustment) or right shifting the register (in the case of a downward adjustment). In a preferred embodiment, the registers are sized to be larger (i.e. hold more bits) than the maximum possible output of ADC 120 to avoid the possibility of overflow error.

When the transmit path has control and TX_ATT=0, the system is in full transmit mode. This means that speech has been detected on the transmit path and the transmit path attenuation has been set to a minimum, or 0 dB. The receive path attenuation has been set at the calculated maximum attenuation level. In the preferred embodiment, the calculated maximum attenuation of attenuator 150 is −28 dB, although attenuators 150, 155 are capable of attenuating signals up to −49 dB. Calculation of maximum attenuation levels is described in detail below.

Since network echoes are typically small in magnitude relative to the acoustic echoes, the value of RX_RESULT does not need to be suppressed by more than 12 dB. As illustrated in step 1210 of FIG. 12 and Table 5-1, this is accomplished by increasing TX_RESULT by 6 dB and decreasing RX_RESULT by 6 dB. This will suppress the network echo but still make it possible for the remote party to break in and gain-control of the path without having to raise his or her voice too much. This is especially important if a handsfree-to-handsfree call is in process, since the receive path may already be attenuated at the remote end, or if the land line is weak, or both.

If TX_ATT is greater than or equal to TX_IDLE, then either the system is in idle or the receive path has control. If the system is in idle mode, both TX_RESULT and RX_RESULT are left unmodified, as shown in step 1230 of FIG. 12. If the receive path has control, the values of TX_RESULT and RX_RESULT will be modified in a succeeding calculation.

If TX_ATT is greater than 0 but less than TX_IDLE, then the audio control system is in a "going-to-idle" state, wherein the transmit path formerly had control, but is now heading toward idle because speech was not detected in the previous sampling iteration. When the audio control system is in a going-to-idle state with the transmit path having control, the receive path is attenuated by 7 dB less than the previous state and the transmit path is attenuated by 7 dB more than in the previous state. In order to compensate for this change, the value of RX_RESULT is adjusted downward by 6 dB in step 1220 and the value of TX_RESULT is left unmodified.

The process then proceeds to step 1235, where the value RX_ATT_TOT is considered. RX_ATT_TOT is a composite value which takes into account the total attenuation of the receive path, including attenuation caused by attenuator 150 and volume control amplifier 130. As described more fully below, the value of RX_ATT_TOT may be calculated using the equation set forth below, or may be found by reference to Table 6.

If the value of RX_ATT_TOT is equal to 0, there is high volume coming out of the loudspeaker 170 (the speaker volume is at level 6 to 7), and the system is in full receive mode. Most of the speech detected on the transmit path 195 is likely being generated by loudspeaker 170. Thus, in step 1240, the value of TX_RESULT is adjusted downward by 12 dB and the value of RX_RESULT is adjusted upward by 12 dB to compensate for loudspeaker echo.

If the value of RX_ATT_TOT is equal to 1 there are two possibilities. Either loudspeaker 170 volume setting is high (6–7) and the receive path has control, but the system is in a going-to-idle state, or the system is in receive state and the volume control setting is medium (4–5). In either case, most of the speech detected on the transmit path 195 is still likely generated by loudspeaker 170, but the transmit result does not have to be suppressed quite as much. Thus, in step 1250, the value of TX_RESULT is adjusted downward by 6 dB and the value of RX_RESULT is adjusted upward by 12 dB.

If the value of RX_ATT_TOT is equal to 2, there are three possibilities. The first is that the volume control is at a low setting (2–3) and the system is in receive state. The second is that the volume control is at a medium setting (4–5) and the system is in a going-to-idle state. The third possibility is that the volume control is at a high setting (6–7) and the system is in idle. Since the sound level output by the loudspeaker 170 is approximately 12–17 dB below the maximum at this point, there is less likelihood that speech detected on the transmit path 195 was generated in the loudspeaker 170. Thus, in step 1260, the value of TX_RESULT is adjusted downward by 6 dB and the value of RX_RESULT is adjusted upward by 6 dB.

If the value of RX_ATT_TOT is equal to 3, there are three possibilities: First, the volume control is set very low (1–2) and the system is in full receive state. Second, the volume control is set low (2–3) and the system is going toward idle from a receive state. Third, the volume control is at a medium or high setting and the system is in idle. In this case, the sound output by the speaker is 18–24 dB lower than maximum, and there is very little likelihood that speech detected on the transmit path 195 was generated by loudspeaker 170. Thus, in step 1270, the value of TX_RESULT is left unchanged and the value of RX_RESULT is adjusted upward by 6 dB.

If the value of RX_ATT_TOT is from 4 to 7, then speech detected on the transmit path was most likely not generated by loudspeaker 170. Thus, both TX_RESULT and RX_RESULT are left unchanged.

The results of the sample weighting process depicted in FIG. 12 are summarized in Table 5-1 and 5-2.

TABLE 5-1

| | Adjustments based on Transmit attenuation level | | |
|---|---|---|---|
| Adjustment/ TX_ATT | TX_ATT = 0 | 0 < TX_ATT < TX_IDLE | TX_ATT >= TX_IDLE |
| TX_RESULT Adjustment | +6dB | +0dB | +0dB |
| RX_RESULT Adjustment | –6dB | –6dB | +0dB |

TABLE 5-2

| | Adjustments based on total receive attenuation level | | | | |
|---|---|---|---|---|---|
| | RX_ATT_TOT | | | | |
| Adjustment/ RX_ATT | 0 | 1 | 2 | 3 | 4–7 |
| TX_RESULT Adjustment | –12dB | –6dB | –6dB | +0dB | +0dB |
| RX_RESULT Adjustment | +12dB | +12dB | +6dB | +6dB | +0dB |

The total receive path attenuation RX_ATT_TOT may be calculated according to the following formula:

$$RX\_ATT\_TOT = RX\_ATT + \left[ \frac{MAX\_LSP\_VOL - LSP\_VOL}{(ATT\_STEP/LSP\_VOL\_STEP)} \right]$$

where MAX_LSP_VOL is equal to the highest setting of volume control amplifier 130 (i.e. 7), LSP_VOL is the current setting of volume control amplifier 130, ATT_STEP is the change in attenuation of attenuator 150 per step, or 7 dB, and LSP_VOL_STEP is the change in volume level of volume control amplifier 130 per step, or 3 dB.

In a preferred embodiment, RX_ATT_TOT may be resolved by reference to a lookup table such as Table 6.

TABLE 6

| Total Receive Path Attenuation | | | | | | | | |
|---|---|---|---|---|---|---|---|---|
| RX_ATT_TOT | | Loudspeaker Volume Control (dB, step) | | | | | | |
| RX_ATT | | –21 | –18 | –15 | –12 | –9 | –6 | –3 | 0 |
| dB | step | 0 | 1 | 2 | 3 | 4 | 5 | 6 | 7 |
| 0 | 0 | 3 | 3 | 2 | 2 | 1 | 1 | 0 | 0 |
| –7 | 1 | 4 | 4 | 3 | 3 | 2 | 2 | 1 | 1 |
| –14 | 2 | 5 | 5 | 4 | 4 | 3 | 3 | 2 | 2 |
| –21 | 3 | 6 | 6 | 5 | 5 | 4 | 4 | 3 | 3 |
| –28 | 4 | 7 | 7 | 6 | 6 | 5 | 5 | 4 | 4 |
| –35 | 5 | 7 | 7 | 7 | 7 | 6 | 6 | 5 | 5 |
| –42 | 6 | 7 | 7 | 7 | 7 | 7 | 7 | 6 | 6 |
| –49 | 7 | 7 | 7 | 7 | 7 | 7 | 7 | 7 | 7 |

Table 6 is read by finding the row corresponding to the current value of RX_ATT (i.e. the current setting of attenuator 150) and reading across to the column corresponding to the current setting of the volume control amplifier 130. For a current RX__ATT setting of 3 and a loudspeaker volume control setting of 5, the value of RX__ATT__TOT is 4. Thus, by reference to FIG. 12 or Table 5-2, it is determined that no adjustments will be made to TX__RESULT or RX__RESULT prior to determining the control path.

-continued
$$\left[\left(\frac{MAX\_LSP\_VOL - LSP\_VOL}{ATT\_STEP/LSP\_VOL\_STEP}\right) + \left(\frac{MAX\_MIC\_SENSE - MIC\_SENSE}{ATT\_STEP/SENSE\_STEP}\right)\right]$$

where the following values are defined:

TABLE 7

Registers used in calculation of effective maximum attenuation level.

| Register | Description | Value |
|---|---|---|
| EFF__MAX__ATT | Effective maximum attenuation | 0-MAX__ATT |
| MAX__ATT | Maximum attenuation necessary at highest loudspeaker volume and microphone input sense levels | 4 (−28dB) |
| ATT__STEP | Change in attenuation per step | 7dB |
| MAX__LSP__VOL | Maximum loudspeaker volume level | 7 (21dB) |
| LSP__VOL | Present loudspeaker volume setting | 0–7 (0–21dB) |
| LSP__VOL__STEP | Change in loudspeaker volume per level | 3dB |
| MAX__MIC__SENSE | Maximum microphone input sense level | 2 (8dB) |
| MIC__SENSE | Present microphone input sense level setting | 0-MAX__MIC__SENS |
| SENSE__STEP | Change in microphone sensitivity per sense level | 4dB |

Accordingly, the weighting of RX__RESULT and TX__RESULT depends on the combination of receive path attenuation by attenuator 150 and volume control level of amplifier 130.

Control Selection

Once the values of RX__RESULT and TX__RESULT have been chosen and weighted in accordance with the processes described above, the values are compared to determine which path should get control. The path with the greater result (RX__RESULT or TX__RESULT) is given control of the audio system for the duration of the next sampling period. If the results are the same (i.e. RX__RESULT =TX__RESULT), then the receive path is given control unless the transmit path had control in the previous sampling period, in which case the transmit path retains control. Because of the weighting process described above with respect to FIG. 12, it is possible that a path could have control of the system even though speech was detected only on the other path.

Path Attenuation Control

When the microprocessor 105 detects speech on a path and determines that the audio control system should be placed in receive state or transmit state, the attenuation level of the attenuator in the path that has control (i.e. the receive path in the case of receive state and the transmit path in the case of transmit state) is set to 0 dB, or minimum attenuation. The attenuation level of the attenuator in the path that does not have control is set to its effective full attenuation level, which may not be the maximum attenuation level possible. The value that is used for effective full attenuation level is referred to as EFF__MAX__ATT, and is calculated according to the following equation:

$$EFF\_MAX\_ATT = MAX\_ATT -$$

In a preferred embodiment, the value of ACT__MAX__ATT is recalculated every time the microphone input sense level or loudspeaker volume level is changed.

The idle level attenuation settings RX__IDLE and TX__IDLE are equal to one half of the calculated value for the effective maximum attenuation EFF__MAX__ATT. An exception is if the effective maximum attenuation EFF__MAX__ATT is less than 2, in which case RX__IDLE and TX__IDLE are each set to a value of 1.

When in a going-to-idle mode, the attenuation of each path is stepped towards idle level attenuation settings each 300 ms.

Background Noise and Threshold Calculation

Figure 13:
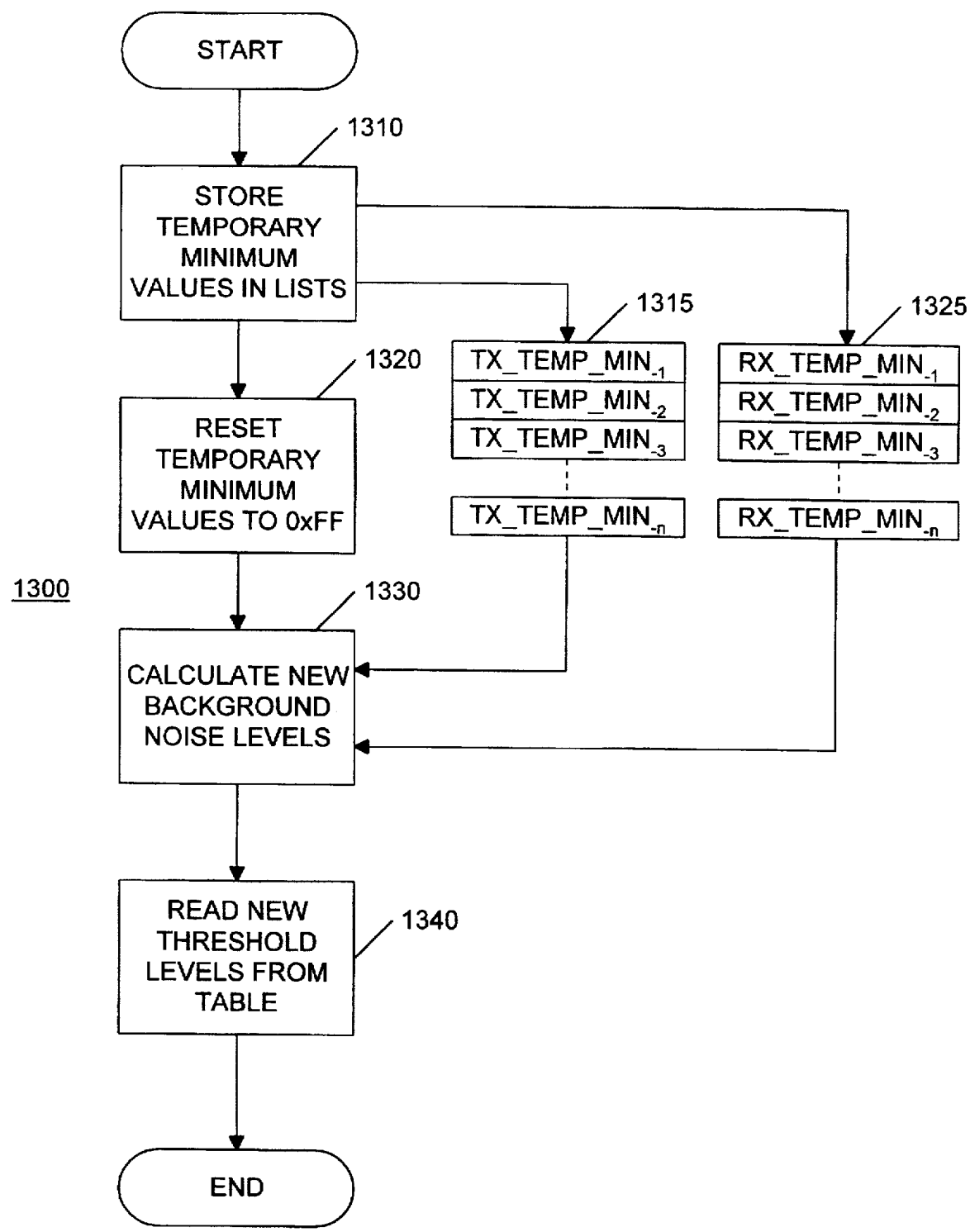
FIG. 13 is a flowchart illustrating the background noise and speech threshold calculation process.

The process of background noise and threshold calculation is illustrated as process 1300 in FIG. 13. Process 1300 is preferably executed once every 300 ms. In step 1310, the temporary minimum values RX_TEMP_MIN and TX_TEMP_MIN calculated in step 860 of process 800 (FIG. 8) are stored in lists 1315, 1325, which contain the most recent three seconds worth of temporary minimum values. Since in the preferred embodiment the background noise calculation is performed every 300 ms, the lists 1315, 1325 must be sized to hold at least 10 values. Lists 1315 and 1325 are first-in-first-out lists containing temporary minimum values TX_TEMP_MIN and RX_TEMP_MIN, respectively.

In step 1320, the temporary minimum values are reset to 0xFF.

Next, in step 1330, new background noise values RX_BACKGND and TX_BACKGND are calculated using the lowest values stored in the lists 1315, 1325 according to the following equation:

$$TX\_BACKGND_{new} = \left( \frac{TX\_BACKGND_{prev} + MIN\_TX\_BACKGND}{2} \right)$$

$$RX\_BACKGND_{new} = \left( \frac{RX\_BACKGND_{prev} + MIN\_RX\_BACKGND}{2} \right)$$

where $TX\_BACKGND_{new}$ and $RX\_BACKGND_{new}$ are the new background noise estimates, $TX\_BACKGND_{prev}$ and $RX\_BACKGND_{prev}$ are the previously calculated background noise estimates, and MIN_TX_BACKGND and MIN_RX_BACKGND are the minimum background noise estimates stored in the lists 1315, 1325. This calculation filters the background noise calculations to prevent sudden changes in background noise level estimates such as may occur due to sudden noise spikes.

Speech threshold values are based on calculated background noise levels. If the background noise level is relatively low, only a small threshold is needed whereas if the noise level is high, a higher threshold is needed. The reason for this is that background noise levels fluctuate in time. For low noise levels, this fluctuation is relatively small. Therefore, a small threshold is needed to insure that detected signals are valid speech. However, for large background noise levels the fluctuation may be relatively large. Thus, for large background noise levels, a higher threshold is required.

As illustrated in step 1340 of FIG. 13, this adaptive threshold selection is accomplished by reference to tables 8-1 (Transmit Path) and 8-2 (Receive Path), which provide preferred threshold values for various background noise levels. For example, for a receive path background noise level of 0x06, the receive path threshold RX_THRESH is 0x0B.

TABLE 8-1

Receive Threshold Table

| Transmit Path Noise Floor [RX_BACKGND] | Transmit Path Threshold [RX_THRESH] |
|---|---|
| 0 × 00 – 0 × 01 | 0 × 05 |
| 0 × 02 – 0 × 04 | 0 × 08 |
| 0 × 05 – 0 × 0D | 0 × 0B |
| 0 × 0E – 0 × FF | 0 × 10 |

TABLE 8-2

Transmit Threshold Table

| Receive Path Noise Floor [TX_BACKGND] | Receive Path Threshold [TX_THRESH] |
|---|---|
| 0 × 00 – 0 × 01 | 0 × 0F |
| 0 × 02 – 0 × 04 | 0 × 14 |
| 0 × 05 – 0 × 0D | 0 × 18 |
| 0 × 0E – 0 × FF | 0 × 25 |

Other Issues

In a preferred embodiment in a portable radiotelephone, the process described herein will be suspended for up to 500 ms during call setup while the microprocessor 105 attends to call setup functions. If the radiotelephone is equipped to transmit dual-tone multi-frequency (DTMF) control tones, then the process must be suspended and the attenuators 150, 155 set to a predefined level while the tones are being transmitted so that the DTMF tones are not accidentally interrupted.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. Accordingly, it is intended that the invention be limited only by the spirit and scope of the claims appended hereto.

What is claimed is:

1. A speakerphone comprising:
  a receive signal path for carrying a received signal;
  a transmit signal path for carrying a transmitted signal;
  a first variable attenuator coupled to said receive signal path and having a plurality of attenuation levels for variably attenuating the received signal;
  a second variable attenuator coupled to said transmit signal path and having a plurality of attenuation levels for variably attenuating the transmitted signal;
  first means, coupled to said receive signal path, for generating a first signal indicative of the signal energy of a signal on the receive signal path;
  second means, coupled to said transmit signal path, for generating a second signal indicative of the signal energy of a signal on the transmit signal path;
  an analog to digital converter (ADC) coupled to said first and second means, said ADC operative to sample said first and second signals at a predetermined sampling interval to generate first and second signal samples;
  a microprocessor coupled to said ADC and said first and second variable attenuators, said microprocessor operative to store said first and second signal samples in first and second sample windows, respectively, and to select first and second signal results from said first and second sample windows, respectively;
  wherein said microprocessor compares said first and second signal results and adjusts the attenuation levels of the first and second attenuators responsive to said comparison.

2. The speakerphone of claim 1, wherein first and second said means for generating each comprise a rectifier circuit.

3. The speakerphone of claim 1, wherein said microprocessor weights said first and second signal results according to the attenuation level of the transmit signal path prior to comparing the first and second signal results.

4. The speakerphone of claim 1, wherein the microprocessor weights said first and second signal results according to the attenuation level of the receive signal path prior to comparing said first and second signal results.

5. The speakerphone of claim 1, wherein the microprocessor weights said first and second signal results are weighted according to the attenuation levels of the transmit signal path and the receive signal path prior to comparing said first and second signal results.

6. The speakerphone of claim 1, wherein said microprocessor subtracts a value corresponding to a hardware-dependent offset value from said first and second signal samples receiving said first and second signal samples.

7. The speakerphone of claim 1, wherein said microprocessor subtracts a value corresponding to an estimated background noise level from said first and second signal samples after receiving said first and second signal samples.

8. The speakerphone of claim 1, wherein said microprocessor subtract a value corresponding to an estimated background noise level and a value corresponding to a hardware-dependent offset value from said first and second signal samples after receiving said first and second signal samples.

9. The speakerphone of claim 1, wherein said microprocessor analyzes said first and second signal results to determine if speech is present on either the transmit signal path or the receive signal path after selecting said first and second signal results.

10. The speakerphone of claim 9, wherein the microprocessor determines if speech is present on a path by comparing the signal result to a threshold value, the threshold value being dependent on the level of background noise on the path.

11. A portable radiotelephone comprising:
a receive signal path for carrying a received signal;
a transmit signal path for carrying a transmitted signal;
a first variable attenuator coupled to said receive signal path and having a plurality of attenuation levels for variably attenuating the received signal;
a second variable attenuator coupled to said transmit signal path and having a plurality of attenuation levels for variably attenuating the transmitted signal;
first means, coupled to said receive signal path, for generating a first signal indicative of the signal energy of a signal on the receive signal path;
second means, coupled to said transmit signal path, for generating a second signal indicative of the signal energy of a signal on the transmit signal path;
an analog to digital converter (ADC) coupled to said first and second means, said ADC operative to sample said first and second signals at a predetermined sampling interval to generate first and second signal samples;
a microprocessor coupled to said ADC and said first and second variable attenuators, said microprocessor operative to store said first and second signal samples in first and second sample windows, respectively, and to select first and second signal results from said first and second sample windows, respectively;
wherein said microprocessor compares said first and second signal results and adjusts the attenuation levels of the first and second attenuators responsive to said comparison.

12. The portable radiotelephone of claim 11, wherein first and second said means for generating each comprise a rectifier circuit.

13. The portable radiotelephone of claim 11, wherein said microprocessor weights said first and second signal results according to the attenuation level of the transmit signal path prior to comparing the first and second signal results.

14. The portable radiotelephone of claim 11, wherein the microprocessor weights said first and second signal results according to the attenuation level of the receive signal path prior to comparing said first and second signal results.

15. The portable radiotelephone of claim 11, wherein the microprocessor weights said first and second signal results are weighted according to the attenuation levels of the transmit signal path and the receive signal path prior to comparing said first and second signal results.

16. The portable radiotelephone of claim 11, wherein said microprocessor subtracts a value corresponding to a hardware-dependent offset value from said first and second signal samples receiving said first and second signal samples.

17. The portable radiotelephone of claim 11, wherein said microprocessor subtracts a value corresponding to an estimated background noise level from said first and second signal samples after receiving said first and second signal samples.

18. The portable radiotelephone of claim 11, wherein said microprocessor subtract a value corresponding to an estimated background noise level and a value corresponding to a hardware-dependent offset value from said first and second signal samples after receiving said first and second signal samples.

19. The portable radiotelephone of claim 11, wherein said microprocessor analyzes said first and second signal results to determine if speech is present on either the transmit signal path or the receive signal path after selecting said first and second signal results.

20. The speakerphone of claim 19, wherein the microprocessor determines if speech is present on a path by comparing the signal result to a threshold value, the threshold value being dependent on the level of background noise on the path.

21. An audio control system for an audio communication device, comprising:
a receive signal path for carrying a received signal;
a transmit signal path for carrying a transmitted signal;
a first variable attenuator coupled to said receive signal path and having a plurality of attenuation levels for variably attenuating the received signal;
a second variable attenuator coupled to said transmit signal path and having a plurality of attenuation levels for variably attenuating the transmitted signal;
first means, coupled to said receive signal path, for generating a first signal indicative of the signal energy of a signal on the receive signal path;
second means, coupled to said transmit signal path, for generating a second signal indicative of the signal energy of a signal on the transmit signal path;
an analog to digital converter (ADC) coupled to said first and second means, said ADC operative to sample said first and second signals at a predetermined sampling interval to generate first and second signal samples;
a microprocessor coupled to said ADC and said first and second variable attenuators, said microprocessor operative to store said first and second signal samples in first and second sample windows, respectively, and to select first and second signal results from said first and second sample windows, respectively;
wherein said microprocessor compares said first and second signal results and adjusts the attenuation levels of the first and second attenuators responsive to said comparison.

22. The audio control system of claim 21, wherein first and second said means for generating each comprise a rectifier circuit.

23. The audio control system of claim 21, wherein said microprocessor weights said first and second signal results according to the attenuation level of the transmit signal path prior to comparing the first and second signal results.

24. The audio control system of claim 21, wherein the microprocessor weights said first and second signal results according to the attenuation level of the receive signal path prior to comparing said first and second signal results.

25. The audio control system of claim 21, wherein the microprocessor weights said first and second signal results are weighted according to the attenuation levels of the transmit signal path and the receive signal path prior to comparing said first and second signal results.

26. The audio control system of claim 21, wherein said microprocessor subtracts a value corresponding to a hardware-dependent offset value from said first and second signal samples receiving said first and second signal samples.

27. The audio control system of claim 21, wherein said microprocessor subtracts a value corresponding to an estimated background noise level from said first and second signal samples after receiving said first and second signal samples.

28. The audio control system of claim 21, wherein said microprocessor subtract a value corresponding to an estimated background noise level and a value corresponding to a hardware-dependent offset value from said first and second signal samples after receiving said first and second signal samples.

29. The audio control system of claim 21, wherein said microprocessor analyzes said first and second signal results to determine if speech is present on either the transmit signal path or the receive signal path after selecting said first and second signal results.

30. The speakerphone of claim 29, wherein the microprocessor determines if speech is present on a path by comparing the signal result to a threshold value, the threshold value being dependent on the level of background noise on the path.

31. A method for suppressing echoes in a telephone receiver having a transmit signal path and a receive signal path, the transmit signal path and the receive signal path having respective attenuation levels, the method comprising the steps of:

generating a first signal indicative of the signal energy of a signal on the transmit signal path;

generating a second signal indicative of the signal energy of a signal on the receive signal path;

sampling said first and second signals at a predetermined sampling interval to generate first and second signal samples;

storing said first and second signal samples in first and second sample windows, respectively;

selecting first and second signal results from said first and second sample windows, respectively;

comparing said first and second signal results; and adjusting the attenuation levels of the transmit signal path and the receive signal path responsive to said comparison.

32. The method of claim 31, wherein, prior to comparing said first and second signal results, said first and second signal results are weighted according to the attenuation level of the transmit signal path.

33. The method of claim 31, wherein, prior to comparing said first and second signal results, said first and second signal results are weighted according to the attenuation level of the receive signal path.

34. The method of claim 31, wherein, prior to comparing said first and second signal results, said first and second signal results are weighted according to the attenuation levels of the transmit signal path and the receive signal path.

35. The method of claim 31, wherein said method further includes the step of subtracting a value corresponding to a hardware-dependent offset value from said first and second signal samples after sampling said first and second signals.

36. The method of claim 31, wherein said method further includes the step of subtracting a value corresponding to an estimated background noise level from said first and second signal samples after sampling said first and second signals.

37. The method of claim 31, wherein said method further includes the step of subtracting a value corresponding to an estimated background noise level and a value corresponding to a hardware-dependent offset value from said first and second signal samples after sampling said first and second signals.

38. The method of claim 31, further including the steps of analyzing said first and second signal results to determine if speech is present on either the transmit signal path or the receive signal path after the step of selecting said first and second signal results.

39. The method of claim 38, further including the step of adjusting the attenuation levels of the transmit path and the receive path responsive to a determination of no speech on either the transmit signal path or the receive signal path.

40. A portable radiotelephone having a transmit signal path and a receive signal path, the transmit signal path and the receive signal path having respective attenuation levels, comprising:

means for generating a first signal indicative of the signal energy of a signal on the transmit signal path;

means for generating a second signal indicative of the signal energy of a signal on the receive signal path;

means for sampling said first and second signals at a predetermined sampling interval to generate first and second signal samples;

means for storing said first and second signal samples in first and second sample windows, respectively, and for selecting first and second signal results from said first and second sample windows, respectively;

means for comparing said first and second signal results; and means for adjusting the attenuation levels of the transmit signal path and the receive signal path responsive to said comparison.

41. The portable radiotelephone of claim 40, wherein said means for comparing includes means for weighting said first and second signal results according to the attenuation level of the transmit signal path.

42. The portable radiotelephone of claim 40, wherein said means for comparing includes means for weighting said first and second signal results according to the attenuation level of the receive signal path.

43. The portable radiotelephone of claim 40, wherein said means for comparing includes means for weighting said first and second signal results according to the attenuation levels of the transmit signal path and the receive signal path.

44. The portable radiotelephone of claim 40, wherein said means for comparing further includes means for subtracting a value corresponding to a hardware-dependent offset value from said first and second signal samples after sampling said first and second signals.

45. The portable radiotelephone of claim 40, wherein said means for comparing further includes means for subtracting a value corresponding to an estimated background noise level from said first and second signal samples after sampling said first and second signals.

46. The portable radiotelephone of claim 40, wherein said means for comparing further includes means for subtracting a value corresponding to an estimated background noise level and a value corresponding to a hardware-dependent offset value from said first and second signal samples after sampling said first and second signals.

47. The portable radiotelephone of claim 40, wherein said means for comparing further includes means for analyzing said first and second signal results to determine if speech is present on either the transmit signal path or the receive signal path after the step of selecting said first and second signal results.

48. The portable radiotelephone of claim 47, further including means for adjusting the attenuation levels of the transmit path and the receive path responsive to a determination of no speech on either the transmit signal path or the receive signal path.

* * * * *